US008120788B2

(12) United States Patent
Kuranoshita

(10) Patent No.: US 8,120,788 B2
(45) Date of Patent: Feb. 21, 2012

(54) IMAGE ARRANGING DEVICE AND IMAGE ARRANGING PROGRAM STORAGE MEDIUM

(75) Inventor: Masashi Kuranoshita, Minato-ku (JP)

(73) Assignee: Fujifilm Corporation, Tokyo (JP)

( * ) Notice: Subject to any disclaimer, the term of this patent is extended or adjusted under 35 U.S.C. 154(b) by 865 days.

(21) Appl. No.: 12/134,375

(22) Filed: Jun. 6, 2008

(65) Prior Publication Data

US 2008/0304885 A1 Dec. 11, 2008

(30) Foreign Application Priority Data

Jun. 11, 2007 (JP) ................................ 2007-153680

(51) Int. Cl.
*G06F 15/00* (2006.01)
*B61H 29/00* (2006.01)

(52) U.S. Cl. ...................................... 358/1.12; 271/184

(58) Field of Classification Search ................. 358/1.12, 358/1.15, 1, 12
See application file for complete search history.

(56) References Cited

U.S. PATENT DOCUMENTS

| | | | | |
|---|---|---|---|---|
| 6,954,546 | B2 | 10/2005 | Sako | |
| 7,286,819 | B2 * | 10/2007 | Isshiki | 455/414.4 |
| 7,465,009 | B2 | 12/2008 | Fujita | |
| 2002/0006218 | A1 | 1/2002 | Sako | |
| 2005/0219300 | A1 | 10/2005 | Fujita | |
| 2011/0063630 | A1 * | 3/2011 | Sato | 358/1.2 |

FOREIGN PATENT DOCUMENTS

| | | | |
|---|---|---|---|
| JP | 8-156443 | A | 6/1996 |
| JP | 8-164685 | A | 6/1996 |
| JP | 11-136422 | A | 5/1999 |
| JP | 2001-169086 | A | 6/2001 |
| JP | 2004-050744 | A | 2/2004 |
| JP | 2005-037993 | A | 2/2005 |
| JP | 2005-313616 | A | 11/2005 |

OTHER PUBLICATIONS

Notification of Reasons for Refusal, dated Oct. 18, 2011, issued in corresponding JP Application No. 2007-153680, 5 pages in English and Japanese.

* cited by examiner

*Primary Examiner* — Saeid Ebrahimi Dehkordy
(74) *Attorney, Agent, or Firm* — Sughrue Mion, PLLC

(57) ABSTRACT

An image arranging device arranging an image in a predetermined region, includes: a regulation obtaining section that obtains an arrangement regulation of the image in the region; and a data obtaining section that obtains print image data which represents a print image to be printed on a print medium and in which a finish size of a printed matter is designated. The device further includes: a protrusion removal section that, regarding the print image represented by the print image data obtained by the data obtaining section, obtains an image portion protruding from the finish size designated by the print image data and removes the obtained image portion; and an image arranging section that, regarding the print image represented by the print image data, arranges an image portion remaining after the removal by the protrusion removal section in the region according to the arrangement regulation obtained by the regulation obtaining section.

10 Claims, 12 Drawing Sheets

IMAGE ARRANGING DEVICE AND IMAGE ARRANGING PROGRAM STORAGE MEDIUM

BACKGROUND OF THE INVENTION

1. Field of the Invention

The present invention relates to an image arranging device and an image arranging program storage medium that stores an image arranging program for arranging an image in a predetermined region.

2. Description of the Related Art

Recently, as a general method for producing a printed matter in printing fields, there is a method including processes of producing image data for printing on a computer, performing output on a sheet of paper on the basis of the produced image data, and applying cutting processing and folding/binding processing to the output matter, thereby a printed matter is completed.

In this method, when an image (hereinafter referred to as view image) with a size within the final size of a printed matter is output onto a sheet of paper, the view image is usually output onto the paper in such a state that a folding margin and a cutting margin required for the post stage of the cutting processing and the folding/binding processing are provided around the view image. In some cases, the view image is output onto the paper with marks of the cutting position and the folding/binding position (so-called register marks) (for example, see Japanese Patent Application Publications Nos. 8-156443, 8-164685, and 2005-37993). The positions of the folding margin and the cutting margin are set when the image data for printing is produced on a computer.

In the production of a printed matter, images of plural pages are output onto one sheet of paper, and these images are usually separated into each image by cutting processing after the output. In the production of the printed matter having such a process, plural images as a material are required to be arranged so as to be suitably fit on a sheet of paper. If the image as a material is the image (hereinafter referred to image with margin) having the cutting margin and the folding margin in addition to the view image, in the conventional methods described in the Japanese Patent Application Publications Nos. 8-156443, 8-164685, and 2005-37993, the plural images with margin are arranged on one sheet of paper. Here, there will described an example in which when the image as a material is two images with margin respectively having the cutting margin, these images are arranged on one sheet of paper by using the conventional method.

FIG. 1 shows an image in which two images with margin are imposed on one sheet of paper by using the conventional method.

As shown in FIG. 1, when the conventional method is used, two images 210 with margin are arranged in the produced image (hereinafter referred to as conventional image) 210*d* in a state that the cutting margin is provided around a view image 2100. Further, there are the cutting margin and the folding margin on the outside of the two images 210 with margin. Therefore, the size of a sheet of paper is relatively large compared to an image region of the two view images 2100, and the distance (width of a cutting margin) W' between the two view images 2100 is unnecessarily long, thereby it is clarified that there are many parts to be wasted in the paper.

SUMMARY OF THE INVENTION

The present invention has been made in view of the above circumstances and provides an image arranging device and an image arranging program which can arrange an image as a material without increasing the size of paper even when the image has a cutting margin and a folding margin.

An image arranging device according to the present invention is a device that arranges an image in a predetermined region and includes:

a regulation obtaining section that obtains an arrangement regulation of the image in the region;

a data obtaining section that obtains print image data which represents a print image to be printed on a print medium and in which a finish size of a printed matter is designated;

a protrusion removal section that, regarding the print image represented by the print image data obtained by the data obtaining section, obtains an image portion protruding from the finish size designated by the print image data and removes the obtained protruding image portion; and an image arranging section that, regarding the print image represented by the print image data, arranges an image portion remaining after the removal by the protrusion removal section in the region in accordance with the arrangement regulation obtained by the regulation obtaining section.

In the image arranging device of the present invention, the image portion protruding from the finish size is removed, thereby only an image existing in the finish size can be removed to be arranged in a page. This results in the reduction of a part to be wasted in the paper when the output is performed on the paper.

Preferably, the image arranging device of the present invention further includes a size comparison section that compares the finish size designated by the print image data obtained by the data obtaining section with a size of a print medium in which a print image represented by the print image data is printed, wherein, when as a result of the comparison by the size comparison section, the finish size is equal to or larger than the size of the print medium, the image arranging section arranges the print image represented by the print image data in the region.

According to this additional feature, even when an image having no image portion that protrudes from the finish size is included in images to be processed, it is possible to arrange the image without checking the protrusion from the finish size.

Moreover, in the image arranging device of the present invention, it is preferable that the print image data obtained by the data obtaining section may be image data in PDF format.

Further, in the image arranging device of the present invention, the image portion removed by the protrusion removal section may be a cut margin and a folding margin. Here, register marks may be written in the cut margin and the folding margin.

An image arranging program storage medium according to the present invention is a medium which stores an image arranging program that causes, when executed in a computer system, the computer system to arrange an image in a predetermined region by implementing in the computer system:

a regulation obtaining section that obtains an arrangement regulation of the image in the region;

a data obtaining section that obtains print image data which represents a print image to be printed on a print medium and in which a finish size of a printed matter is designated;

a protrusion removal section that, regarding the print image represented by the print image data obtained by the data obtaining section, obtains an image portion protruding from the finish size designated by the print image data and removes the obtained image portion; and an image arranging section that, regarding the print image represented by the print image data, arranges an image portion remaining after the removal by the protrusion removal section in the region in accordance with the arrangement regulation obtained by the regulation obtaining section.

When the image arranging program stored in the image arranging program storage medium of the present invention is executed in the computer system, the image arranging device of the present invention can be easily realized.

In order to avoid repetition in the description, only the basic feature of the image arranging program storage medium of the present invention has been described above. However, the image arranging program storage medium according to the present invention also includes features corresponding to the above-described various additional features of the image arranging device of the present invention.

Further, each of the elements such as the image arranging section implemented in the computer system by the image arranging program may be established by either a single program component or plural program components. Alternatively, these elements may be collectively established by a single program component. In addition, these elements may execute the operation by themselves or by giving instructions to other program or program component installed in a computer system.

According to the present invention, it is possible to arrange an image without increasing the size of paper even when an image serving as a material has a cut margin and a folding margin.

DETAILED DESCRIPTION OF THE INVENTION

Hereinafter, an embodiment of the present invention will be described with reference to the drawings.

Figure 2:
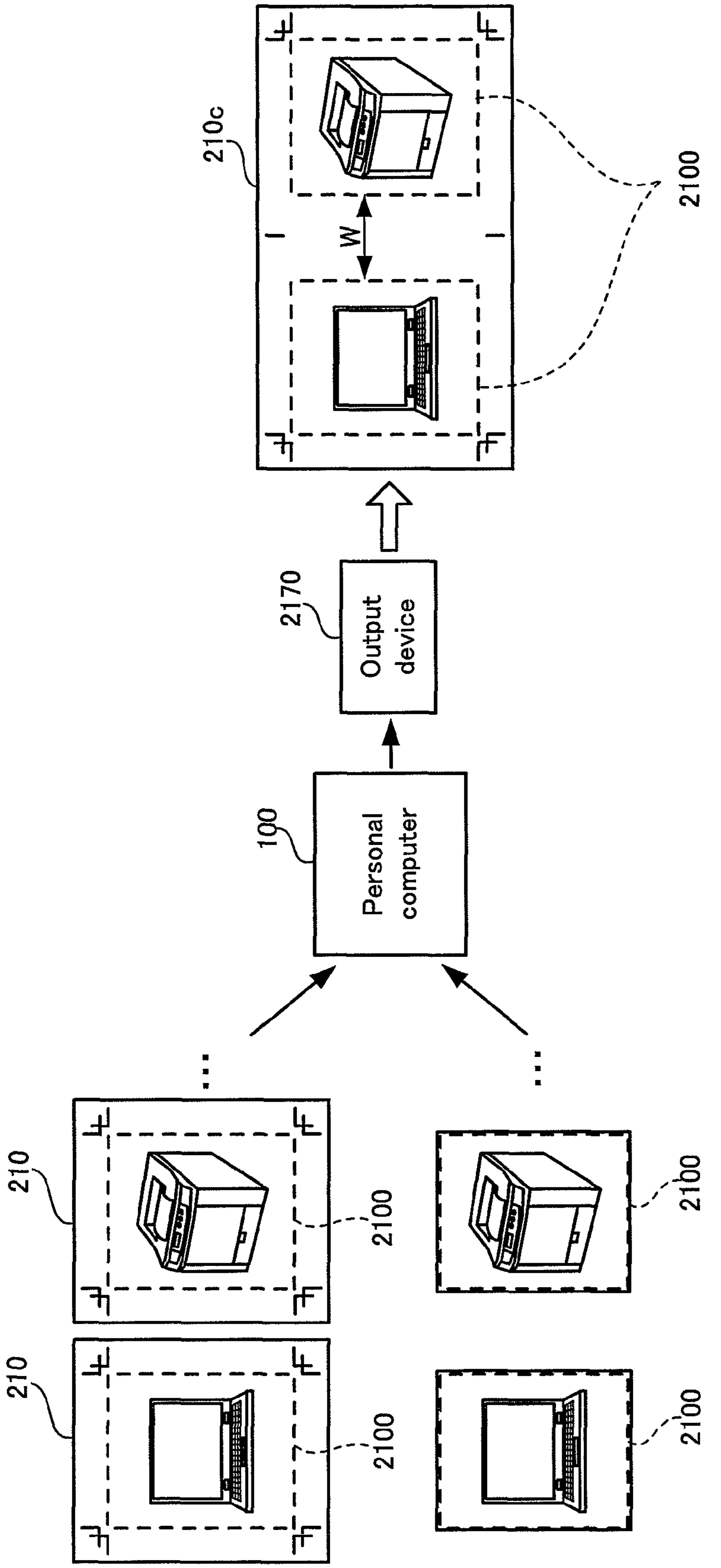
FIG. 2 is a configuration diagram of an image imposing system to which one embodiment of the present invention is applied.

FIG. 2 is a configuration diagram of an image imposing system to which one embodiment of the present invention is applied.

The image imposing system has a personal computer 100 and an output device 2170. In this image imposing system, upon receipt of inputs of image data representing an image as a material (material image) and information (arrangement information) about how to arrange plural material images on one sheet of paper, the personal computer 100 produces the image data representing plural images imposed on the paper, and the output device 2170 then outputs the material image onto the paper on the basis of the produced image data. In the following example to be described, in a case where a material image is output at the rate of one image per sheet, when image data representing a catalogue, which is produced by applying the cutting processing to a sheet of paper with the material image output thereon, is input as input data of the image imposing system, the image data representing plural images imposed on one sheet of paper is produced and output in order to produce a manual. Hereinafter, the image data to be input and the image data to be produced will be described as data in PDF format, which is a kind of page description data. However, the data format except the PDF format may be adopted.

As the material image input into the image imposing system, there are two types of images, one of which is an image 210 with margin having the cutting margin and the folding margin (in this example, the image has only the cut margin) and the other of which is an image 2100 (hereinafter referred to as view image) without the cutting margin and the folding margin in the bottom line of the left side of FIG. 2. In this case, the image 210 with margin is the view image 2100 with the cutting margin and the folding margin provided therearound. In the image 210 with margin shown in FIG. 2, register marks representing a position of the cutting margin are respectively provided at the four corners of the view image 2100. The personal computer 100 can produce an imposed image, in which the plural view images 2100 are imposed on one sheet of paper, with the use of only the view image 2100 independently of the type of the material image. As an example of the imposed image, an imposed image 210*c* in which the two view images 2100 are imposed on one sheet of paper is shown in FIG. 2. The cutting margin and the folding margin are provided in the imposed image 210*c*, and in addition, the register marks representing positions of the cutting margin and folding margin are written in the imposed image 210*c*. Incidentally, in the present invention, the view image 2100 may be reduced or enlarged in the imposing of the view image 2100.

Figure 1:
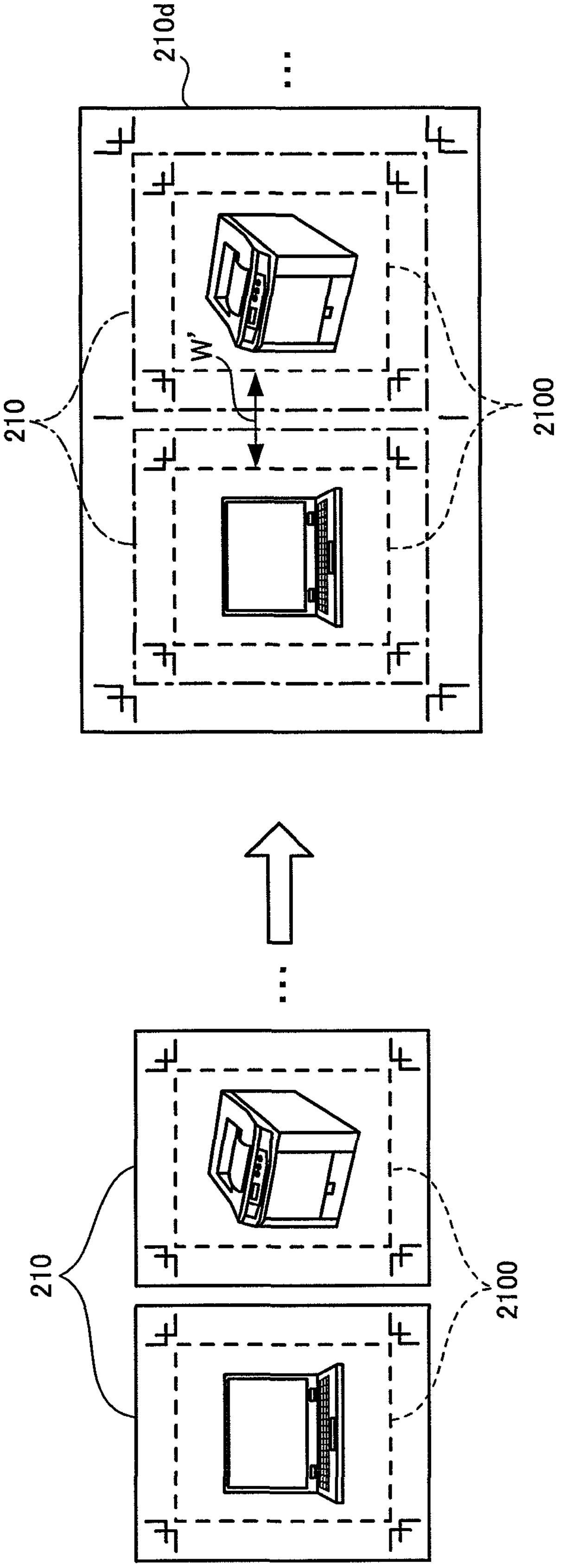
FIG. 1 is a view showing an image in which two images with margin are imposed on one sheet of paper using the conventional method.

In this embodiment, the view image 2100 in the imposed image 210*c* is the same and has the same size as the view image 2100 in the conventional image 210*d* shown in FIG. 1. In the comparison between the imposed image 210*c* of FIG. 2 and the conventional image 210*d* of FIG. 1, since the imposed image 210*c* does not have the cutting margin and the folding margin, which are originally provided in the image 210 with margin, the paper size is smaller than that of the conventional image 210*d*, and the distance (width of a cutting margin) W between the two view images 2100 in the imposed image 210*c* is appropriate to be shorter than the width of a cutting margin W' of the conventional image 210*d*. Thus, in the imposed image 210*c* of FIG. 2, the percentage of the view image 2100 with respect to the entire paper size is larger than that of the conventional image 210*d*, thereby when the output is performed on a sheet of paper, the part to be wasted on the paper is small. The image imposing system of FIG. 2 can automatically produce the imposed image 210*c* with the view image 2100 accounting for a large percentage of the entire paper size without requiring image editing by users. In this image imposing system, the personal computer 100 is operated as one embodiment of the image arranging device of the present invention. Hereinafter, the personal computer 100 will be described.

Figure 3:
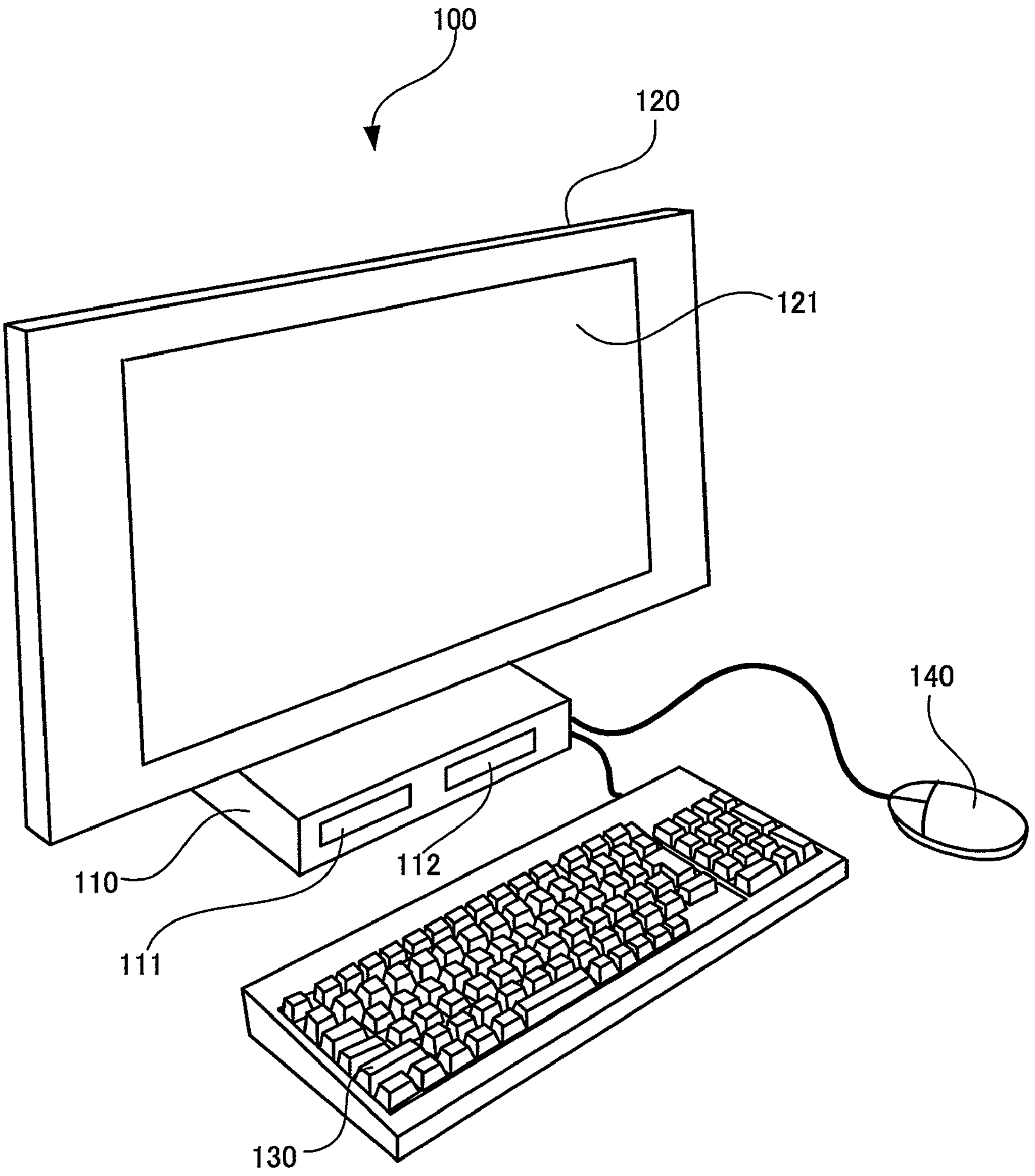
FIG. 3 is an appearance perspective view of a personal computer operated as one embodiment of the image arranging device of the present invention.
Figure 4:
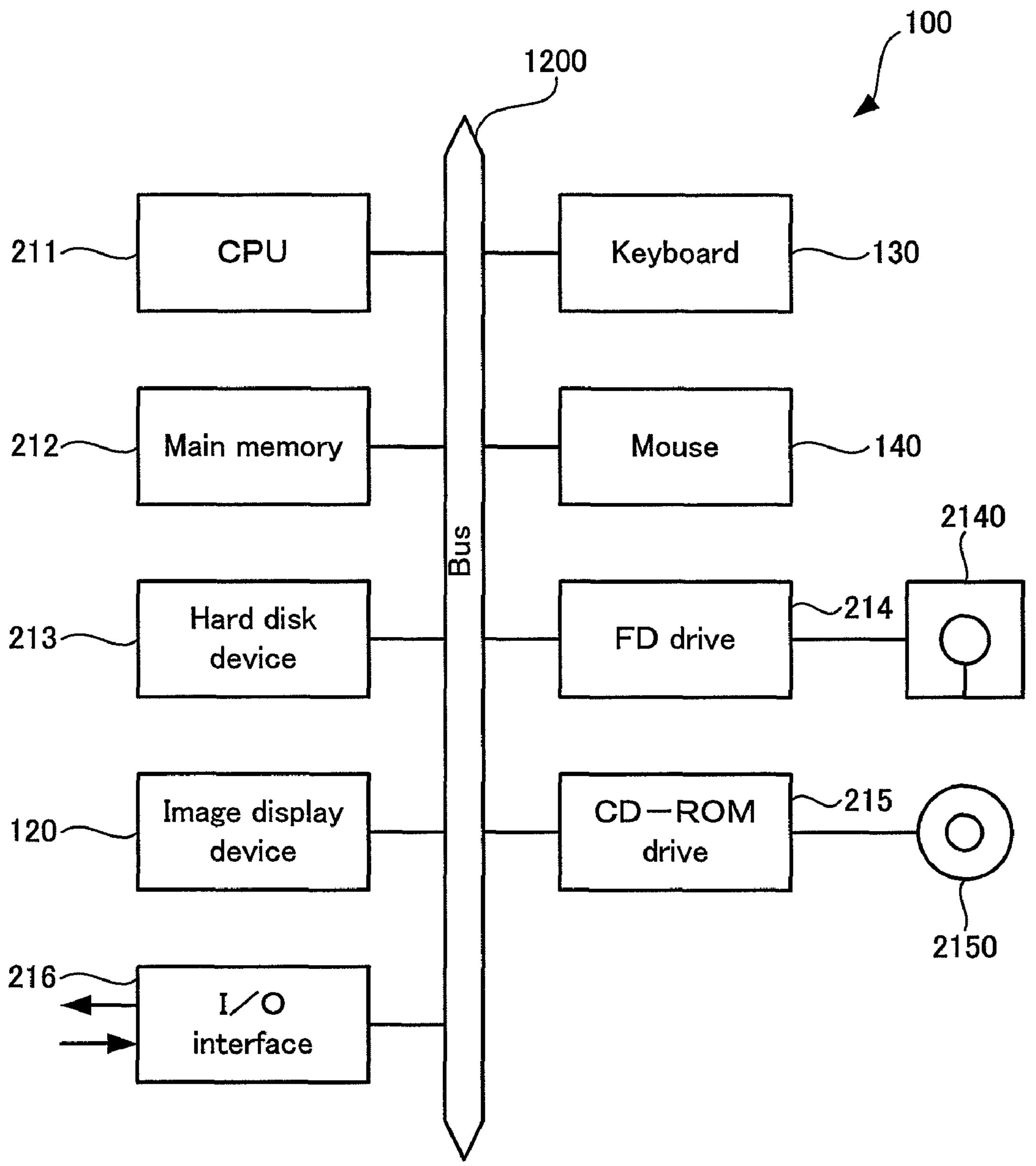
FIG. 4 is a structural diagram of hardware of the personal computer operated as one embodiment of the image arranging device of the present invention.

FIG. 3 is an appearance perspective view of a personal computer operated as one embodiment of the image arranging device of the present invention. FIG. 4 is a configuration diagram of the hardware of the personal computer.

The personal computer 100 is provided with a main unit 110 with an CPU, a RAM memory, a hard disk, and the like (described later) built therein, an image display device 120 for displaying an image on a display screen 121 in response to the instruction from the main unit 110, a keyboard 130 used for input of user's instruction and character information into the personal computer 100, and a mouse 140 used for input of an instruction according to a designated arbitrary position on the display screen 121.

The main unit 110 further has an FD loading gate 111 through which a flexible disk (hereinafter referred to as FD) is loaded and a CD-ROM loading gate 112 through which a CD-ROM is loaded. The FD loading gate 111 includes an after mentioned FD drive for driving the loaded FD, and the CD-ROM loading gate 112 includes an after mentioned CD-ROM drive for driving the loaded CD-ROM.

As shown in FIG. 4, the main unit 110 includes a CPU 211 which executes various programs, a main memory 212 used when the CPU 211 reads out a program stored in a hard disk device 213 to develop and execute the program, the hard disk device 213 in which various programs, data, and the like are stored, and an FD drive 214 which accesses a FD 2140 loaded therein, and a CD-ROM drive 215 which accesses a CD-ROM 2150 loaded therein. Those components, the image display device 120, the keyboard 130, and the mouse 140 shown in FIG. 3 are connected to each other through a bus 1200. Further, an output device 2170 shown in FIG. 2 is provided outside the personal computer 100, and an input/output interface 216 is built in the personal computer 100 for the purpose of sending output data from the personal computer 100 to the input device 217. The input/output interface 216 is also connected to the above components constituting the hardware of the personal computer 100 through the bus 1200.

Next, one embodiment of the image arranging program of the present invention will be described.

Assume that one example of the image arranging program of the present invention is stored in, for example, the CD-ROM 2150 serving as one embodiment of the image arranging program storage medium of the present invention. In this case, if the CD-ROM 2150 is loaded in the main unit 110 through the CD-ROM loading gate 112, the image arranging program stored in the CD-ROM 2150 is installed in the hard disk device 213 of the personal computer 100 by the CD-ROM drive 215. Then, when the image arranging program installed in the hard disk device 213 is activated, the personal computer 100 operates as one embodiment of the image arranging device of the present invention.

Figure 5:
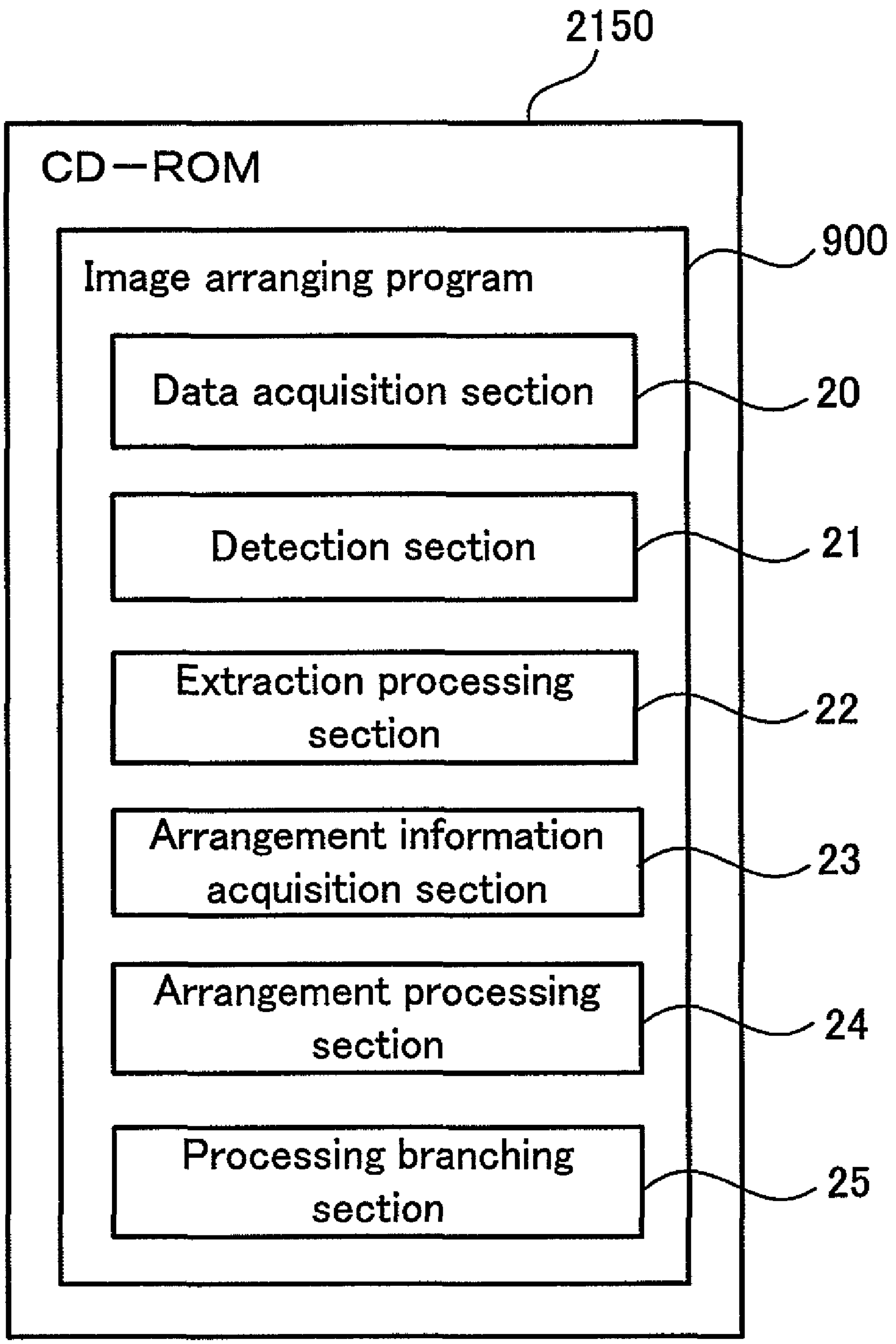
FIG. 5 is a view showing one embodiment of an image arranging program of the present invention.

FIG. 5 is a view showing one embodiment of the image arranging program of the present invention.

In this case, an image arranging program 900 is stored in the CD-ROM 2150. As a storage medium in which the image arranging program 900 is stored, in addition to the CD-ROM 2150 shown in FIG. 5, various storage media including the hard disk device 213 and the FD 2140 shown in FIG. 4, a DVD, an MO, and the like (not shown in FIGS. 4 and 5) can be adopted.

The image arranging program 900 is executed in the personal computer 100 shown in FIGS. 3 and 4 to operate the personal computer 100 as one embodiment of the present invention, and has a data acquisition section 20, a detection section 21, an extraction processing section 22, an arrangement information acquisition section 23, an arrangement processing section 24, and a processing branching section 25.

The detailed content of each component of the image arranging program 900 will be described with the operation of each section of the personal computer 100.

Figure 6:
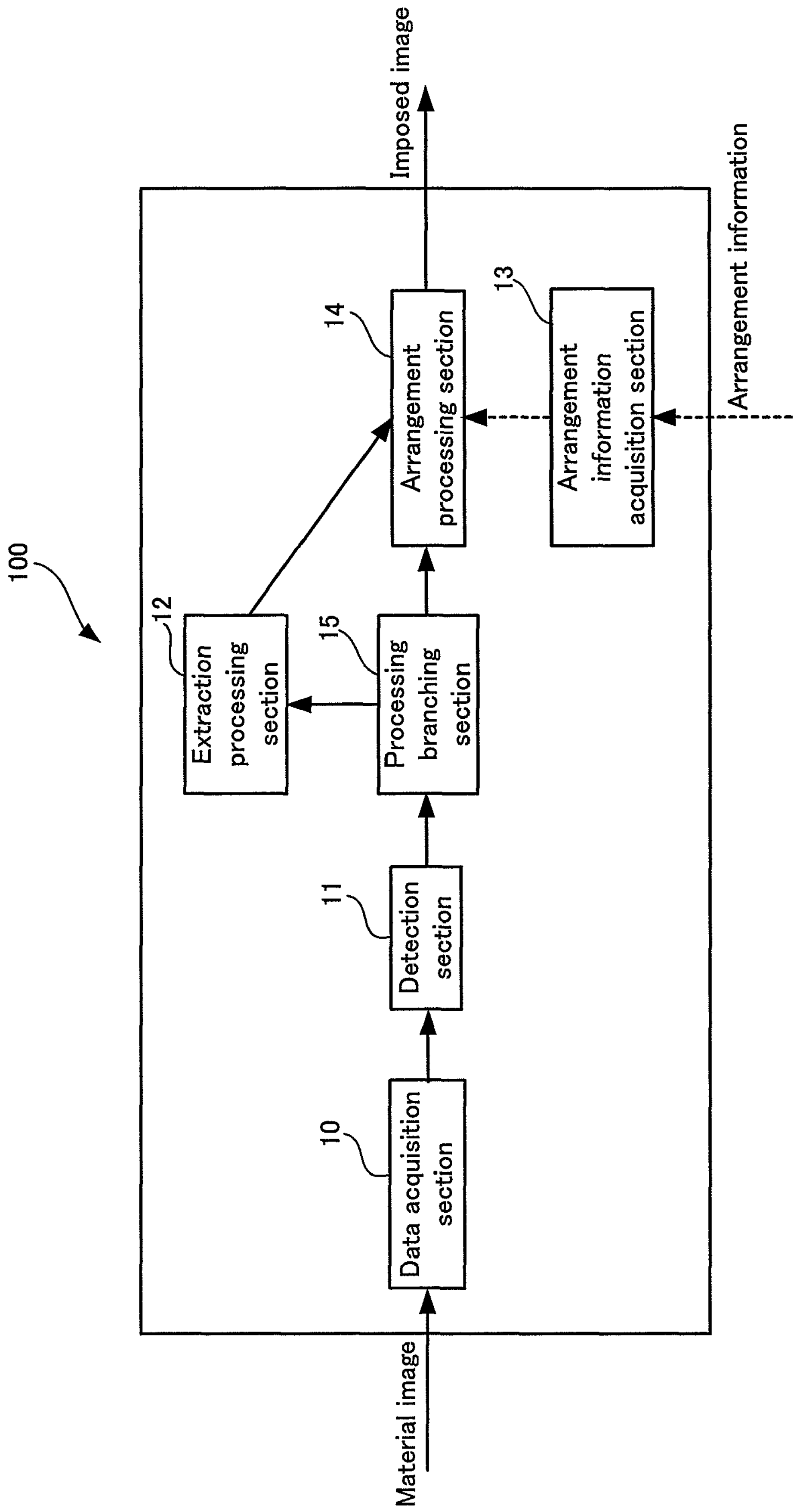
FIG. 6 is a view showing an outline of components established on a personal computer shown in FIGS. 3 and 4 in order to operate the personal computer as one embodiment of the image arranging device of the present invention and showing an outline of the operation by these components.

FIG. 6 is a view showing an outline of components established on the personal computer shown in FIGS. 3 and 4 in order to operate the personal computer as one embodiment of the image arranging device of the present invention and showing an outline of the operation of these components.

When the image arranging program 900 shown in FIG. 5 is installed in the personal computer shown in FIGS. 3 and 4, a data acquisition section 10, a detection section 11, an extraction processing section 12, an arrangement information acquisition section 13, an arranging processing section 14, and an processing branching section 15 are established on the personal computer 100, and the personal computer 100 then operates as one embodiment of the present invention. The data acquisition section 10, the detection section 11, the extraction processing section 12, the arrangement information acquisition section 13, the arranging processing section 14, and the processing branching section 15 are established on the personal computer 100 respectively by the data acquisition part 20, the detection section 21, the extraction processing section 22, the arrangement information acquisition section 23, the arranging processing section 24, and the processing branching section 25 in the image arranging program 900 shown in FIG. 5. Thus, each component in FIG. 5 corresponds to each component in FIG. 6. However, each component in FIG. 6 is constituted by a combination of the hardware of the personal computer 100 shown in FIGS. 3 and 4 and the software including an OS and an application program executed in the personal computer 100, while each component of the image arranging program 900 shown in FIG. 5 is constituted by only the application program.

Hereinafter, each component shown in FIG. 6 and the outline of the operation of the components will be described.

The data acquisition section 10 obtains image data in PDF format having an image in each page. The arrangement information acquisition section 13 obtains position information (arrangement information) of the view image 2100 in the imposed image 210*c* (shown in FIG. 2) input by a user. The arrangement information acquisition section 13 is provided with a GUI for input of the arrangement information. A user edits the position and number of the view image 2100 on the paper through the GUI. The detection section 11 analyzes the image data obtained by the data acquisition section 10 to detect a size of each page and an image region (finish size) of the view image 2100 (shown in FIG. 2) in the material image. On the basis of the detection result of the detection section 11, the processing branching section 15 determines whether the material image of each page is the image 210 with margin having the cutting margin and the folding margin or the image having only the view image 2100 without the cutting margin and the folding margin to branch the subsequent processing of the image data in accordance with the determination result. Specifically, when the material image is the image 210 with margin, the extraction operation of the view image 2100 is performed by the extraction processing section 12, and the extracted view image is input into the arrangement processing section 14. Meanwhile, when the material image is the image having only the view image 2100, the view image 2100 is input into the arrangement processing section 14 as it is without the extraction operation. The arrangement information from the arrangement information acquisition section 13 is also input into the arrangement processing section 14, and the arrangement processing section 14 arranges the view image 2100 in a page by using the arrangement method represented by the arrangement information to produce the imposed image 210*c* of FIG. 2. The image data representing the imposed image 210*c* is output to the output device 2170 (not shown in FIG. 6, see FIG. 1). The data acquisition section 10 corresponds to an example of the data obtaining section of the present invention, the arrangement information acquisition section 13 corresponds to an example of the regulation obtaining section of the present invention, the combination of the detection section 11 and the extraction processing section 12 corresponds to an example of the protrusion removal section of the present invention. Further, the arrangement processing section 14 corresponds to an example of the image arranging section of the present invention, and the processing branching section 15 corresponds to an example of the size comparison section of the present invention.

Next, the image data in PDF format to be processed which is input into the personal computer 100 to be obtained by the data acquisition section 10 will be described.

Figure 7:
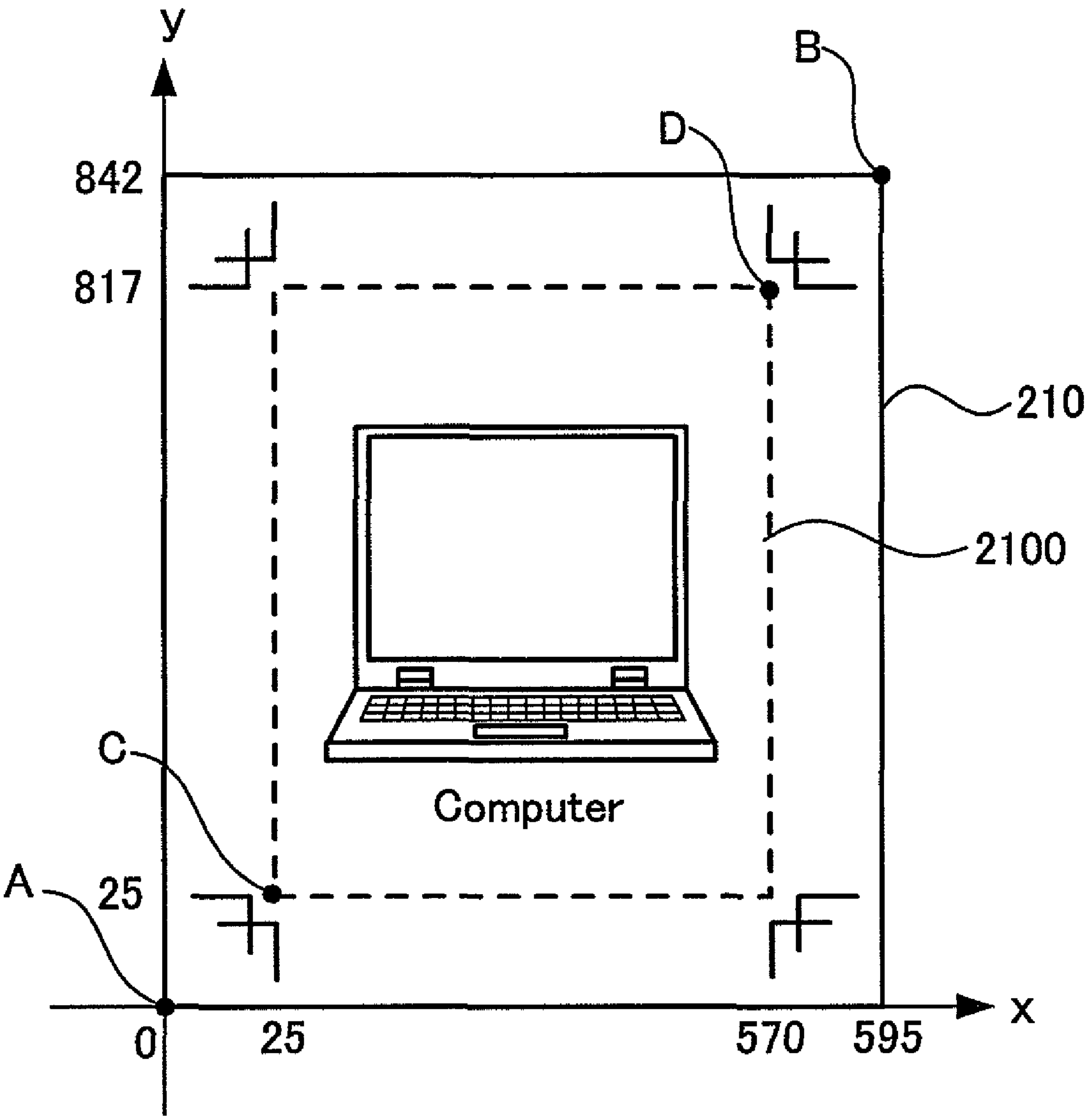
FIG. 7 is a schematic diagram showing the entirety of an image with margin and a position of a view image in a two-dimensional coordinate space when the material image is the image with margin.
Figure 8:
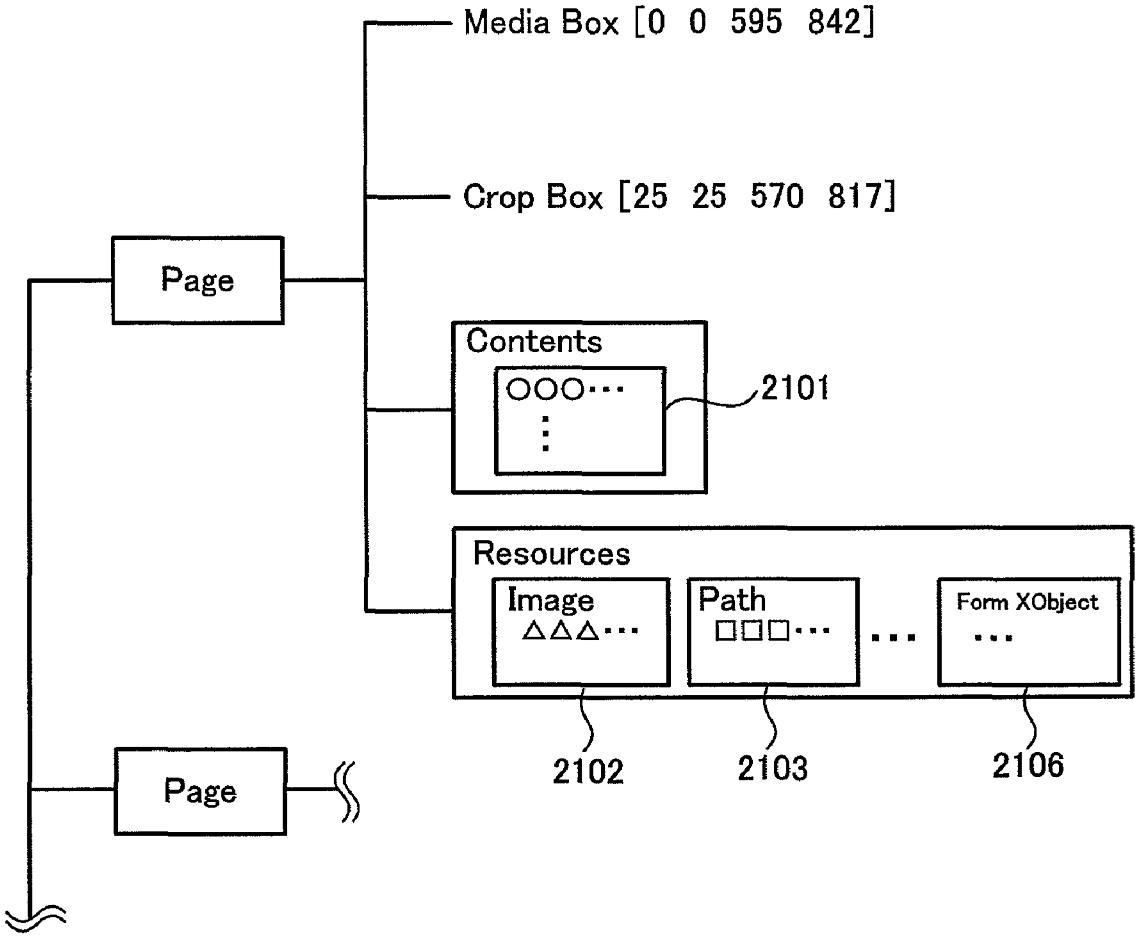
FIG. 8 is a schematic diagram showing a structure of image data in PDF format representing the image with margin of FIG. 7.

FIG. 7 is a schematic diagram showing the entirety of an image with margin and a position of a view image in a two-dimensional coordinate space when the material image is the image with margin. FIG. 8 is a schematic diagram showing a structure of the image data in PDF format representing the image with margin of FIG. 7.

When a rectangular image region of the image 210 with margin is represented in the two-dimensional coordinate space, the position of the entire image 210 with margin is represented by a sequence of four numeric values including two coordinate components of the coordinates of the apex at the lower left corner of the image region and two coordinate components of the coordinates of the apex at the upper right corner. For instance, in FIG. 7, the apex A at the lower left corner of the image region of the image 210 with margin is superimposed on the origin 0, and the coordinates is (0, 0). The coordinates of the apex B at the upper right corner of the image region of the image 210 with margin are (595, 842). Here, in the image data in PDF format, as shown in FIG. 8, each page schematically has a structure in which data representing information of each page are arranged. In FIG. 8, the data structure of the image data in PDF format which is a tree-shaped structure following the "Page" is shown. In this structure, one page means one material image. As shown in the parentheses following "Media Box" in the first line of FIG. 8, four numeric values: [0, 0, 595, 842], in which the coordinate components of the two coordinate points are arranged, are described in the data representing information of a page having the image 210 with margin. The position and width (page size) of the image region of the image 210 with margin are represented by those four numeric values.

When a rectangular image region of the view image 2100 is represented in the two-dimensional coordinate space, in the image data in PDF format, the image region of the view image 2100 in the image 210 with margin is also represented by a sequence of four numeric values including two coordinate components of the coordinates of the apex at the lower left corner of the image region and two coordinate components of the coordinates of the apex at the upper right corner. For instance, in FIG. 7, the apex C at the lower left corner of the image region of the view image 2100 is (25, 25), and the coordinates of the apex D at the upper right corner is (570, 817). In the data representing information of a page of the image 210 with margin with the view image 2100 arranged therein, the position and width (finish size) of the image region of the view image 2100 are represented by four numeric values: [25, 25, 570, 817] in the parentheses following "Crop Box" in the second line of FIG. 8.

In this embodiment, although the example in which the material image is the image with margin has been described, "Media Box" and "Crop Box" in the image data in PDF format are provided as the data representing the page size and the finish size, regardless of types of the material image. Therefore, when the material image has only the view image 2100 without the cutting margin and the folding margin, as a result, the sequence of four numeric values of "Media Box" in the image data is the same as that of "Crop Box", and in a two-dimensional coordinate system in which the apex at the lower left corner of the view image 2100 is the origin, the image region of the view image 2100 is represented by a sequence of four numeric values including two coordinate components of the apex of the lower left corner of the view image 2100 and two coordinate components of the apex of the upper right corner of the same. For instance, if the material image having only the view image 2100 has the same width as the view image 2100 in the image 210 with margin of FIG. 7, both the four numeric values of "Media Box" and the four numeric values of "Crop Box" are represented as [0, 0, 545, 792]. Here, when the image region of the view image 2100 of FIG. 7 is parallel-translated such that the apex of the lower left corner of the image region reaches the origin, the third and fourth numeric values are coordinate components of the apex of the upper right corner of the parallel-translated image region of the view image 2100, and these third and fourth numeric values are obtained by respectively subtracting the coordinate components of the apex C of the lower left corner of the image region of the view image 2100 of FIG. 7 respectively from the coordinate components of the apex D of the upper right corner.

In this embodiment, the type of the material image is discriminated by comparing the value of "Media Box" with the value of "Crop Box".

Next, the operation of each section of FIG. 6 in the production of the imposed image 210*c* will be described in detail.

Figure 9:
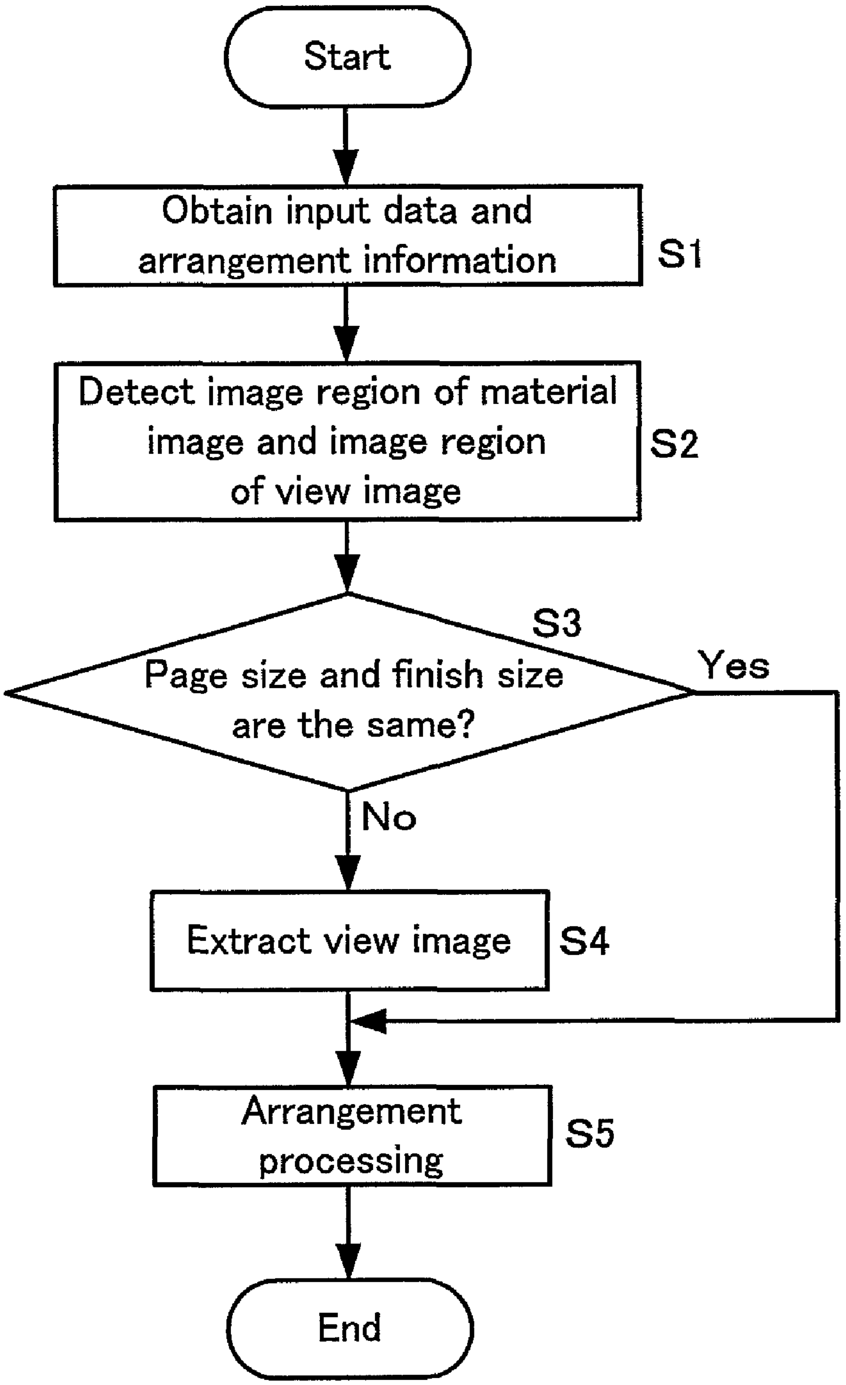
FIG. 9 is a flow chart showing the operation of each section of FIG. 6 in the production of an imposed image.

FIG. 9 is a flow chart showing the operation of each section of FIG. 6 in the production of the imposed image.

When the image data in PDF format representing the material image is input into the personal computer 100, it is stored in the hard disk device 213 of FIG. 4. Then, the image data as a target to be processed is obtained from the hard disk device 213 by the data acquisition section 10 of FIG. 6. Meanwhile, the arrangement information which has been input by a user and specifies a method for arranging the material image is obtained by the arrangement information acquisition section 13 of FIG. 6 (step S1). Next, the detection section 11 of FIG. 6 analyzes the image data to detect the image region of the entire material image and the image region of the view image 2100 (shown in FIG. 2) in the material image (step S2).

Specifically, the detection section 11 detects four numeric values in the parentheses following "Media Box" and four numeric values in the parentheses following "Crop Box". The processing branching section 15 compares respectively the four numeric values in the parentheses following "Media Box" with the four numeric values in the parentheses following "Crop Box", thereby determines whether the page size and the finish size are the same (step S3). When it is determined that the page size and the finish size are the same (step S3: Yes), the data of the page is input into the arrangement processing section 14 of FIG. 6 by the processing branching section 15. When it is determined that the page size and the finish size are not the same (step S3: No), the page data is input into the extraction processing section 12 of FIG. 6 by the processing branching section 15, and the view image 2100 is then subjected to the extraction processing (step S4). The processing of the data input into the arrangement processing section 14 in the case in which the answer in step S3 is "Yes" will be described later. The extraction processing of the view image 2100 applied by the extraction processing section 12 will be hereinafter described.

The extraction processing section 12 receives the input of the data to replace the four numeric values in the parentheses following "Media Box" in the input data with the four numeric values in the parentheses following "Crop Box". Specifically, in the example in FIG. 8, the four numeric values of "Media Box": [0, 0, 595, 842] are replaced with the four numeric values: [25, 25, 570, 817]. The extraction processing is performed thereby the page size shown by a rectangular shape depicted by solid lines in FIG. 7 is reduced to be the same as the finish size shown by a rectangular shape depicted by dotted lines in FIG. 7. Here, as shown in FIG. 8, in the data representing information of a page, there is a content information section 2101 having information specifying an expression form of characters and a picture. Further, there is a path information section 2103 having information of a position where various data exist in PDF data and various resource information such as an image information section 2102 in which the content of an image is represented. When the material image is moved in the two-dimensional surface of FIG. 7, the same processing (data conversion) is required to be performed to the entirety of the content information section 2101 and the image information section 2101 as the data. When the same processing (data conversion) is performed to the entire group of data about a page, a form XObject section 2106 in which the group of data to be processed is arranged is provided in the data representing the information of the page. After the replacement of the four numeric values of "Media Box", the extraction processing section 12 moves the resource information such as the path information section 2103 and the image information section 2102 and the content information section 2101 into the form XObject section 2106 to write information representing the content of parallel translation, in which the apex of the lower left corner of the view image 2100 is superimposed on the origin in the two-dimensional surface, into the data as described later such that the parallel translation is realized in the information having been moved into the form XObject section 2106.

Figure 10:
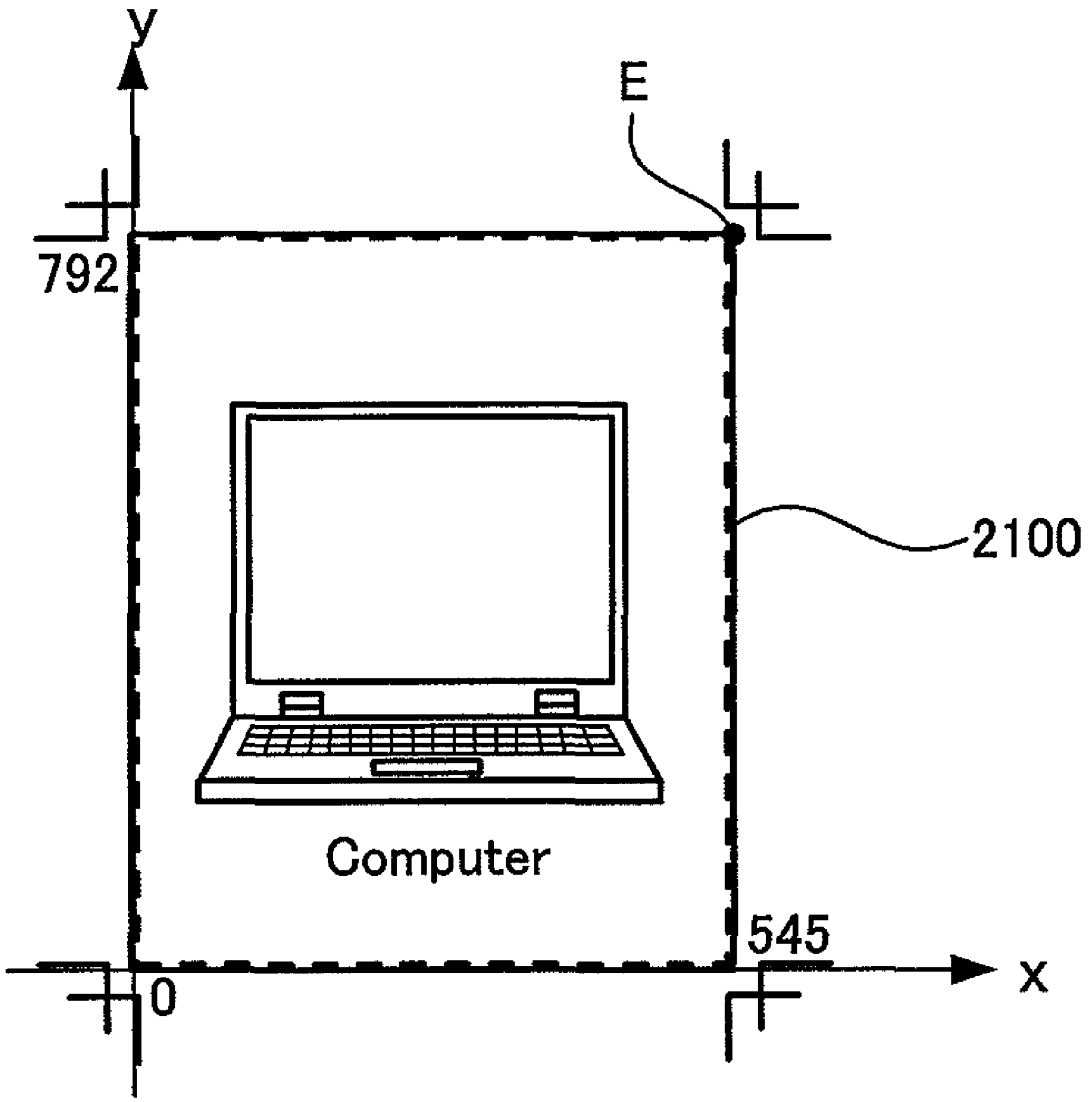
FIG. 10 is a schematic diagram in which, regarding the page having the material image of FIG. 7, the image region of the image with margin and the view image after parallel translation of page content is represented in the two-dimensional coordinate space.
Figure 11:
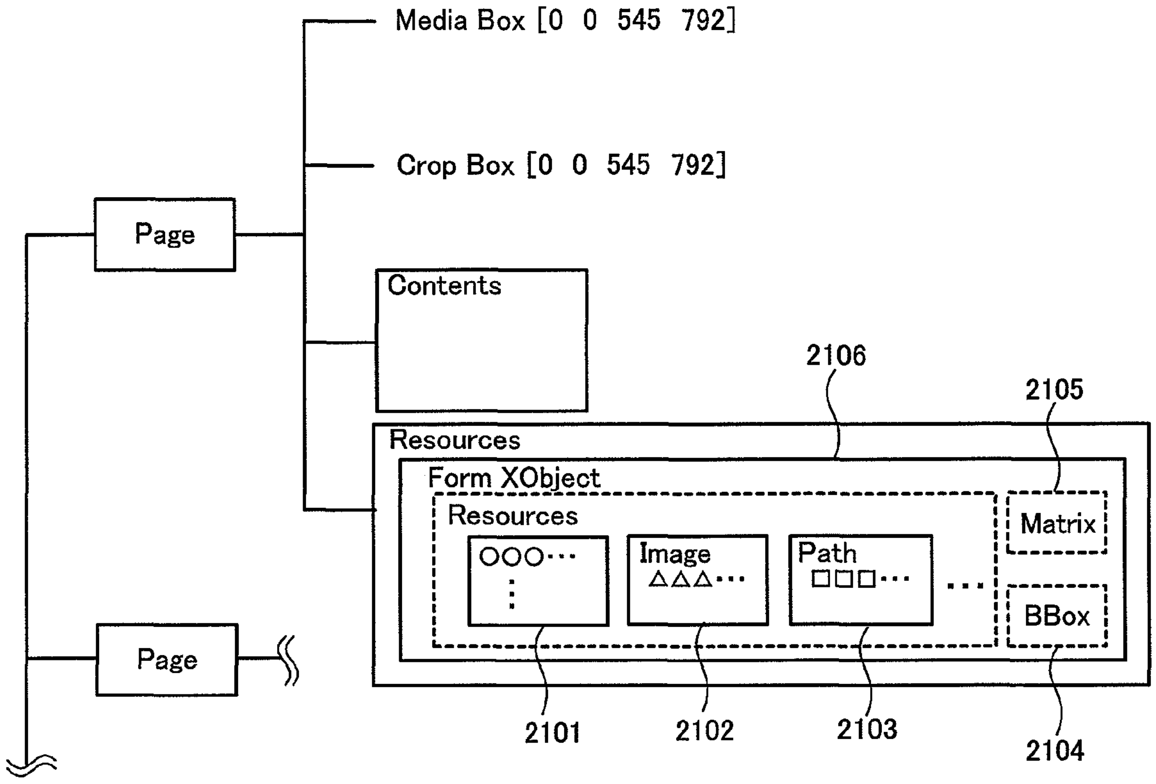
FIG. 11 is a schematic diagram showing a structure of the image data after the parallel translation of the page content.

FIG. 10 is a schematic diagram in which, regarding the page having the material image of FIG. 7, the image region of the image with margin and the view image after the parallel translation of the page content is represented in the two-dimensional coordinate space. FIG. 11 is a schematic diagram showing a structure of the image data after the parallel translation of the page content.

As shown in FIG. 10, the page size shown by a rectangular shape depicted by solid lines is superimposed on the finish size shown by a rectangular shape depicted by dotted lines. Further, in comparison with the state in FIG. 7, the entire page is parallel-translated in the lower left direction, and the apex of the lower left corner of the rectangular shape of the finish size shown by the dotted lines (the apex of the lower left corner of the image region of the view image) coincides with the origin. Specifically, the coordinate components of the apex C of the lower left corner (shown in FIG. 7) with the coordinates (25, 25) are replaced with the coordinate components of the origin (0, 0) (shown in FIG. 10), while the coordinate components of the apex D of the upper right corner (shown in FIG. 7) with the coordinates (570, 817) are replaced with the coordinate components of the apex E (545, 792) (shown in FIG. 10). Thus, as shown in the schematic diagram of the data structure in FIG. 11, both the four numeric values of "Media Box" and the four numeric values of "Crop Box" are described as [0, 0, 545, 792]. The resource information such as the path information section 2103 and the image information section 2101 except the form XObject section 2106 and the content section 2101 shown in FIG. 7 are arranged as the resource information in the form XObject section 2106, as shown in FIG. 10. Further, a matrix information section 2105 is provided in the form XObject section 2106. Matrix information specifying a matrix element for the coordinate conversion, which includes rotation, scaling, and parallel translation in the two-dimensional surface and in which the conversion method is represented by a matrix, is arranged in the matrix information section 2105. The matrix element specifying the conversion method in the parallel translation is written in the matrix information section 2105 by the extraction processing section 12. When the matrix element is written in the matrix information section 2105, in a case where the display, output, or editing of an image is performed in a device that supports the PDF format, the image in a page is parallel-translated in accordance with the matrix element of the matrix information section 2105 to display, output, or edit the image. Then, the extraction processing section 12 clips (cuts out) the image region of the view image of FIG. 10 to produce the image having only the view image without the register marks.

Figure 12:
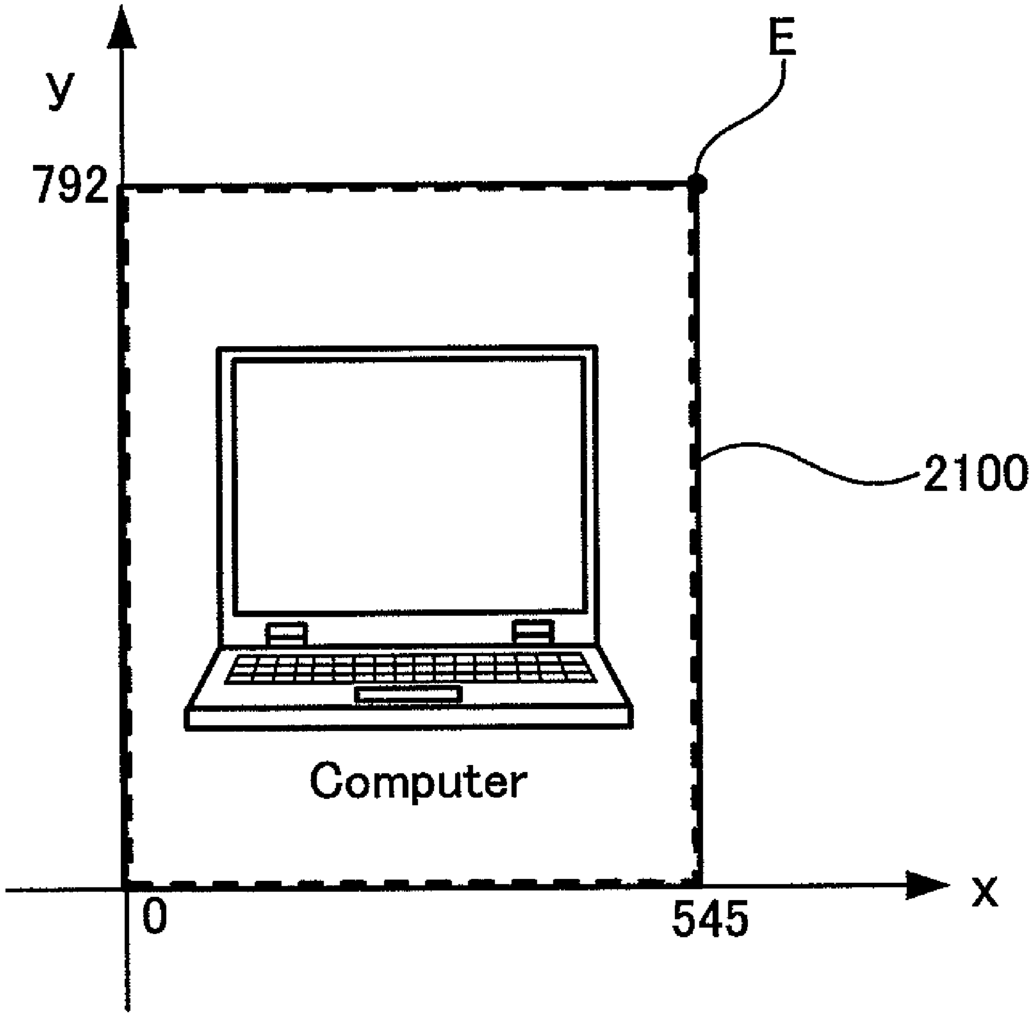
FIG. 12 is a schematic diagram in which, regarding a page of FIG. 10, the image region of the view image having been subjected to a clip processing is represented in the two-dimensional coordinate space.

FIG. 12 is a schematic diagram in which, regarding a page of FIG. 10, the image region of the view image having been subjected to the clip processing is represented in the two-dimensional coordinate space.

The region of the view image 2100 is clipped from the image region of FIG. 10, thereby the image without the register marks can be obtained as shown in FIG. 12. Here, as with the four numeric values of "Media Box" specifying the page size and the four numeric values of "Crop Box" specifying the finish size, the four numeric values obtained from the coordinate components of the apex of the upper right corner of the clip region and the coordinate components of the apex of the lower left corner are written in a BBox information section 2104 in the form XObject section 2106 of FIG. 11, thereby the image region to be clipped (clip region) is designated. Specifically, the obtained four numeric values are written as [0, 0, 545, 792]. When the four numeric values are described in the BBox information section 2104, a valid region of the image represented by the image data is restricted to the region specified by the four numeric values in the parentheses following "BBox". In the state that the information is written in the BBox information section 2104, in the display or the like by the device supporting the PDF format, only an image described in the valid region is treated as a target to be displayed or the like. The data after the information is written in the BBox information section 2104 is input into the arranging processing section 14 of FIG. 6.

As described above, when the material image is the image having only the view image 2100 without the cutting margin and the folding margin, it is determined that the page size and the finish size are the same in step S3, and the data representing the image is input into the arranging processing section 14. Therefore, both in the case in which the material image is the image 210 with margin, and in the case in which the material image is the image 2100 having only the view image without the cutting margin and the folding margin, the image represented by the data input into the arranging processing section 14 of FIG. 6 is the image having only the view image 2100 without the cutting margin and the folding margin. Thus, the arranging processing section 14 arranges the view image 2100 in a page with a pattern according to the arrangement information input in step S1 of FIG. 9 (step S5 of FIG. 9). As a technique of arranging an image in a page, a well-known technique adopting an editing apparatus supporting the PDF format is used. Specifically, a pair of two data representing the view image 2100 of FIG. 12 is established as data representing an image content of one page. The processing in steps S1 to S5 of FIG. 9 are applied to all the pages having the material image, and the image data in PDF format constituted by a page having the imposed image 210*c* is produced. The image representing the imposed image 210*c* is output by the output device 2170 of FIG. 2 on the basis of the produced image data in PDF format.

As above described, in the image imposing system of FIG. 2, the image data representing the imposed image with the view image 2100 accounting for a large percentage in the entire paper size is produced by the operation of the personal computer 100, thereby the output is performed without wasting a sheet of paper.

What is claimed is:

1. An image arranging device that arranges an image in a predetermined region, comprising:

a regulation obtaining section that obtains an arrangement regulation of the image in the region;

a data obtaining section that obtains print image data which represents a print image to be printed on a print medium and in which a finish size of a printed matter is designated;

a protrusion removal section that, regarding the print image represented by the print image data obtained by the data obtaining section, obtains an image portion protruding from the finish size designated by the print image data and removes the obtained protruding image portion; and an image arranging section that, regarding the print image represented by the print image data, arranges an image portion remaining after the removal by the protrusion removal section in the region in accordance with the arrangement regulation obtained by the regulation obtaining section.

2. The image arranging device according to claim 1, further comprising a size comparison section that compares the finish size designated by the print image data obtained by the data obtaining section with a size of a print medium in which a print image represented by the print image data is printed, wherein, when as a result of the comparison by the size comparison section, the finish size is equal to or larger than the size of the print medium, the image arranging section arranges the print image represented by the print image data in the region.

3. The image arranging device according to claim 1, wherein the print image data obtained by the data obtaining section is image data in PDF format.

4. The image arranging device according to claim 1, wherein the image portion removed by the protrusion removal section is a cut margin and a folding margin.

5. The image arranging device according to claim 4, wherein register marks are written in the cut margin and the folding margin.

6. A non-transitory computer-readable-medium storing a computer program to perform image arranging, when executed in a computer system, the computer system to arrange an image in a predetermined region by implementing in the computer system:

a regulation obtaining section that obtains an arrangement regulation of the image in the region;

a data obtaining section that obtains print image data which represents a print image to be printed on a print medium and in which a finish size of a printed matter is designated;

a protrusion removal section that, regarding the print image represented by the print image data obtained by the data obtaining section, obtains an image portion protruding from the finish size designated by the print image data and removes the obtained image portion; and an image arranging section that, regarding the print image represented by the print image data, arranges an image portion remaining after the removal by the protrusion removal section in the region in accordance with the arrangement regulation obtained by the regulation obtaining section.

7. The non-transitory computer-readable-medium storing a computer program to perform image arranging according to claim 6, wherein the image arranging program further implements in the computer system a size comparison section that compares the finish size designated by the print image data obtained by the data obtaining section with a size of a print medium in which a print image represented by the print image data is printed, and when as a result of the comparison by the size comparison section, the finish size is equal to or larger than the size of the print medium, the image arranging section arranges the print image represented by the print image data in the region.

8. The non-transitory computer-readable-medium storing a computer program to perform image arranging according to claim 6, wherein the print image data obtained by the data obtaining section is image data in PDF format.

9. The non-transitory computer-readable-medium storing a computer program to perform image arranging according to claim 6, wherein the image portion removed by the protrusion removal section is a cut margin and a folding margin.

10. The non-transitory computer-readable-medium storing a computer program to perform image arranging according to claim 9, wherein register marks are written in the cut margin and the folding margin.

* * * * *